United States Patent
Harada

(10) Patent No.: US 7,019,625 B2
(45) Date of Patent: Mar. 28, 2006

(54) VEHICLE ELECTRONIC CONTROL SYSTEM WITH ANTI-THEFT CAPABILITY AND METHOD OF CONTROLLING A VEHICLE ENGINE

(75) Inventor: Ryoichi Harada, Saitama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 169 days.

(21) Appl. No.: 10/489,206

(22) PCT Filed: Jul. 2, 2003

(86) PCT No.: PCT/JP03/08398

§ 371 (c)(1),
(2), (4) Date: Mar. 10, 2004

(87) PCT Pub. No.: WO2004/007254

PCT Pub. Date: Jan. 22, 2004

(65) Prior Publication Data

US 2004/0239187 A1 Dec. 2, 2004

(30) Foreign Application Priority Data

Jul. 10, 2002 (JP) .............................. 2002-201414

(51) Int. Cl.
*B60R 25/10* (2006.01)

(52) U.S. Cl. ............................. 340/426.1; 340/426.13; 340/426.3

(58) Field of Classification Search ............ 340/426.1, 340/426.13, 426.14, 426.15, 426.3, 426.31; 235/439, 451, 492; 709/222, 225; 701/36, 701/48

See application file for complete search history.

(56) References Cited

U.S. PATENT DOCUMENTS

| 5,091,856 | A | * | 2/1992 | Hasegawa et al. ............. 701/36 |
| 5,841,983 | A | * | 11/1998 | Takaba et al. ............... 709/225 |
| 6,572,015 | B1 | * | 6/2003 | Norton ........................ 235/382 |
| 2001/0009394 | A1 | | 7/2001 | Yanaka | |

FOREIGN PATENT DOCUMENTS

JP 8268229 1/1996

(Continued)

OTHER PUBLICATIONS

Japanese Search Report dated Oct. 3, 2003, 2 pages.

*Primary Examiner*—Van T. Trieu
(74) *Attorney, Agent, or Firm*—Connolly Bove Lodge & Hutz LLP

(57) ABSTRACT

Unit-specific identification data (IDA, IDB) of a transmission electronic control unit (5) and an engine electronic control unit (4) are stored in memories (5A, 4A), and engine start data (DES) required for starting an engine (2) are stored in the memory (4A) of the transmission electronic control unit (5). At the time of engine starting, the validity of the combination of the transmission electronic control unit (5) and the engine electronic control unit (4) is checked in the transmission electronic control unit (5) based on the identification data (IDA, IDB), and the engine start data (DES) are sent from the transmission electronic control unit (5) to the engine electronic control unit (4) in response to a request from the engine electronic control unit (4) only when validity is confirmed.

3 Claims, 3 Drawing Sheets

FOREIGN PATENT DOCUMENTS

| | | |
|---|---|---|
| JP | 8-91176 | 4/1996 |
| JP | 8-185577 | 7/1996 |
| JP | 8185577 | 7/1996 |
| JP | 8-268229 | 10/1996 |
| JP | 10-244853 | 9/1998 |
| JP | 10244853 | 9/1998 |
| JP | 2001-200666 | 7/2001 |
| JP | 2001191142 | 7/2001 |
| JP | 2001200666 | 7/2001 |
| JP | 2002201414 | 7/2002 |
| JP | 2003008398 | 1/2003 |

* cited by examiner

VEHICLE ELECTRONIC CONTROL SYSTEM WITH ANTI-THEFT CAPABILITY AND METHOD OF CONTROLLING A VEHICLE ENGINE

TECHNICAL FIELD

The present invention relates to a vehicle electronic control system with anti-theft capability and a method of controlling a vehicle engine.

BACKGROUND ART

Various proposals have been offered regarding the protection of vehicles against theft Japanese Unexamined Patent Publication No. Hei 8(1996)-91176, for example, teaches an arrangement in which engine control means is provided that checks a key ID code against a reference ID and enables engine starting when the two are in a relationship defined beforehand, and the engine control means is connected with various drive/control means to be controlled by connectors having a unique shapes in accordance with the configuration thereof, whereby the connectors of an engine control means of another configuration and the connectors of the various drive/control means cannot be properly electrically connected.

However, this proposed system does not always function as an effective immobilizer because the engine can be easily started by obtaining another genuine engine control means whose ID code is known and replacing the engine control means installed in the vehicle.

An object of the present invention is therefore to provide a vehicle electronic control system with anti-theft capability and a method of controlling a vehicle engine which overcome this problem of the prior art.

Another object of the present invention is to provide a method of controlling a vehicle engine capable of preventing vehicle theft.

DISCLOSURE OF THE INVENTION

Many vehicles in wide use today are equipped with a micro-hybrid transmission control unit or other such automatic transmission control system having an electronic control unit built into the transmission and with an engine control system constituted to include a separate electronic control unit for controlling the operation of the engine. The present invention focuses on this fact to provide a vehicle with anti-theft capability by interconnecting the vehicle systems through an onboard LAN or the like to enable exchange of data between the systems, providing each system with its own unique identification data, utilizing the identification data to check whether the combination of the two systems is valid, and sending prescribed data required for engine starting from the automatic transmission control system to the engine control system only when the combination is found to be valid.

One feature of the present invention resides in the point that in a vehicle electronic control system with anti-theft capability, which includes an automatic transmission control system having a transmission electronic control unit built into a transmission and an engine control system constituted to comprise an engine electronic control unit for controlling engine operation, unit-specific identification data are stored in each of the transmission electronic control unit and the engine electronic control unit for identifying the units, engine start data required for starting the engine are stored in the transmission electronic control unit, and, at the time of engine starting, the validity of the combination of the transmission electronic control unit and the engine electronic control unit is checked based on the unit-specific identification data, and the engine start data are supplied to the engine control system only when validity is confirmed.

Another feature of the present invention resides in the point that in a method of controlling a vehicle engine of a vehicle including an automatic transmission control system having a transmission electronic control unit built into a transmission and an engine control system constituted to comprise an engine electronic control unit for controlling engine operation, the method comprises, in the transmission electronic control unit at the time of engine starting, a discrimination step for discriminating validity of the combination with the engine electronic control unit and a step of sending engine start data required for starting the engine from the automatic transmission control system to the engine control system only when validity is confirmed in the discrimination step.

Whether or not the combination of the automatic transmission control system and the engine control system is valid can be established at the time of combining these systems in individual vehicles by assigning identification data for defining validity. By also storing the prescribed data required for starting the engine in the automatic transmission control system at this time, it becomes possible to effectively prevent vehicle theft because even if the electronic control unit for the engine control system is replaced with another genuine unit, the data required for starting the engine will not be sent from the electronic control unit of the automatic transmission control system in this engine control system. On the other hand, since the electronic unit of the automatic transmission control system is installed inside the transmission at the factory, it is not easy to replace, i.e., requires a great deal of work to replace, so that the invention is very effective for preventing vehicle theft.

BEST MODE OF CARRYING OUT THE INVENTION

Figure 1:
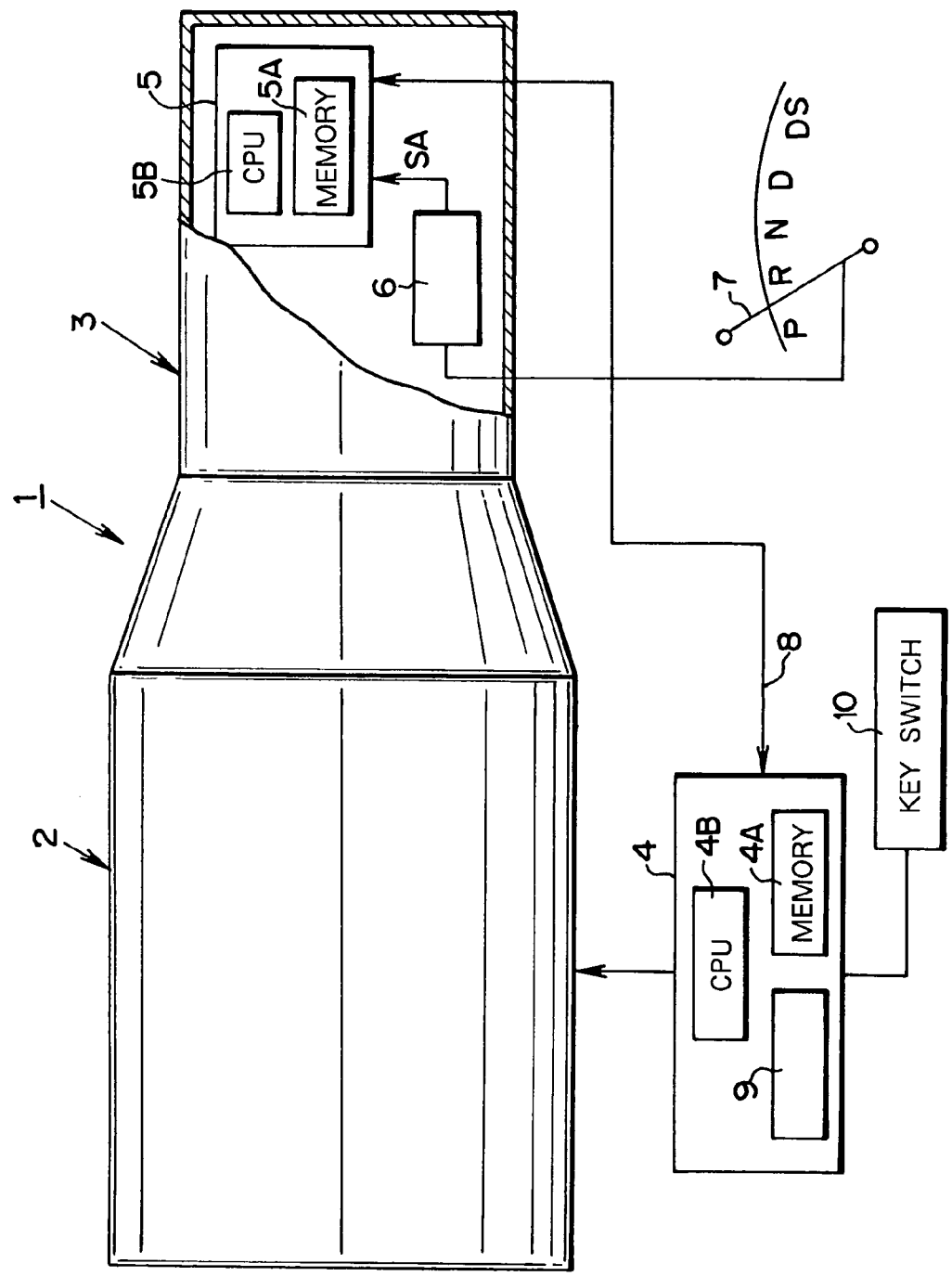
FIG. 1 is an overall schematic diagram showing an embodiment of the present invention.

FIG. 1 shows a vehicle system 1 equipped with a vehicle electronic control system with anti-theft capability according to the present invention, wherein 2 designates an engine and 3 designates an automatic transmission installed on the output side of the engine 2. The engine 2 is configured to be electronically controlled by an engine electronic control unit 4, and the automatic transmission 3 is configured to be electronically controlled by a transmission electronic control unit 5 installed inside a casing 3A thereof. A position switch 6 mounted in the automatic transmission 3 detects the position at which a select lever 7 is set and sends a position signal SA representing the detection result to the transmission electronic control unit 5.

Thus the vehicle system 1 includes an automatic transmission control system that electronically controls the automatic transmission 3 using the transmission electronic control unit 5 and an engine control system that electronically controls the engine 2 using the engine electronic control unit 4. The engine electronic control unit 4 and the transmission electronic control unit 5 are interconnected by an onboard LAN 8 and can exchange data via the onboard LAN 8.

The engine electronic control unit 4 is constituted as a microcomputer and has a memory 4A that stores unit-specific identification data IDA for distinguishing the engine electronic control unit 4 from other engine electronic control units. The transmission electronic control unit 5 is also constituted as a microcomputer and has a memory 5A that stores unit-specific identification data IDB for distinguishing the transmission electronic control unit 5 from other transmission electronic control units. The memory 5A also stores engine start data DES that the engine electronic control unit 4 requires for starting the engine 2.

The foregoing system for electronically controlling the vehicle system 1 is configured as a vehicle electronic control system with anti-theft capability so as to function as an immobilizer. To this end, the engine electronic control unit 4 is equipped with an immobilizer unit 9 for inputting an operator's personal identification number. Control for starting the engine is initiated when the operator turns on a key switch 10 and then inputs a prescribed personal identification number through the immobilizer unit 9.

Figure 2:
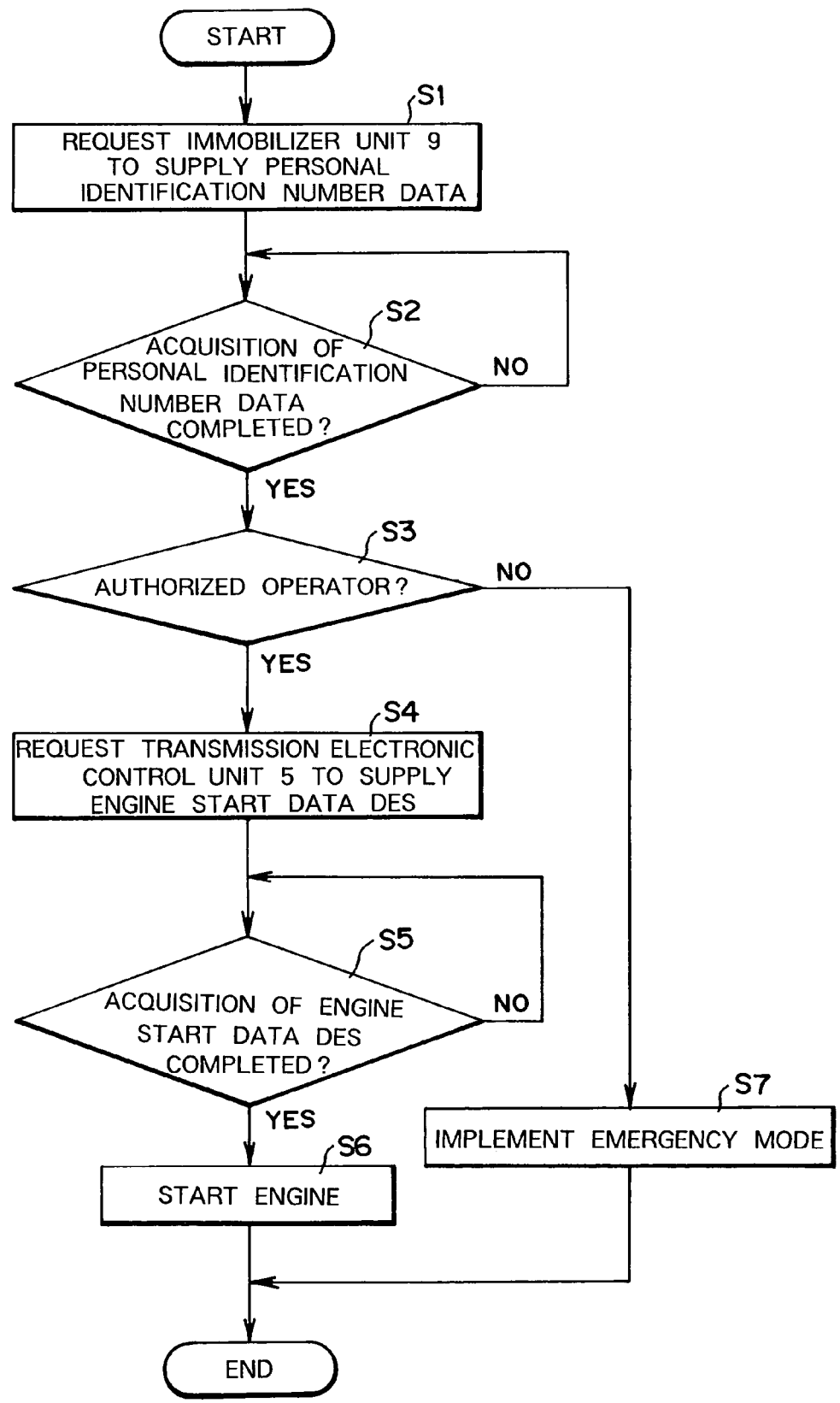
FIG. 2 is a flow chart representing an engine control processing program executed in the CPU of the engine electronic control unit shown in FIG. 1.
Figure 3:
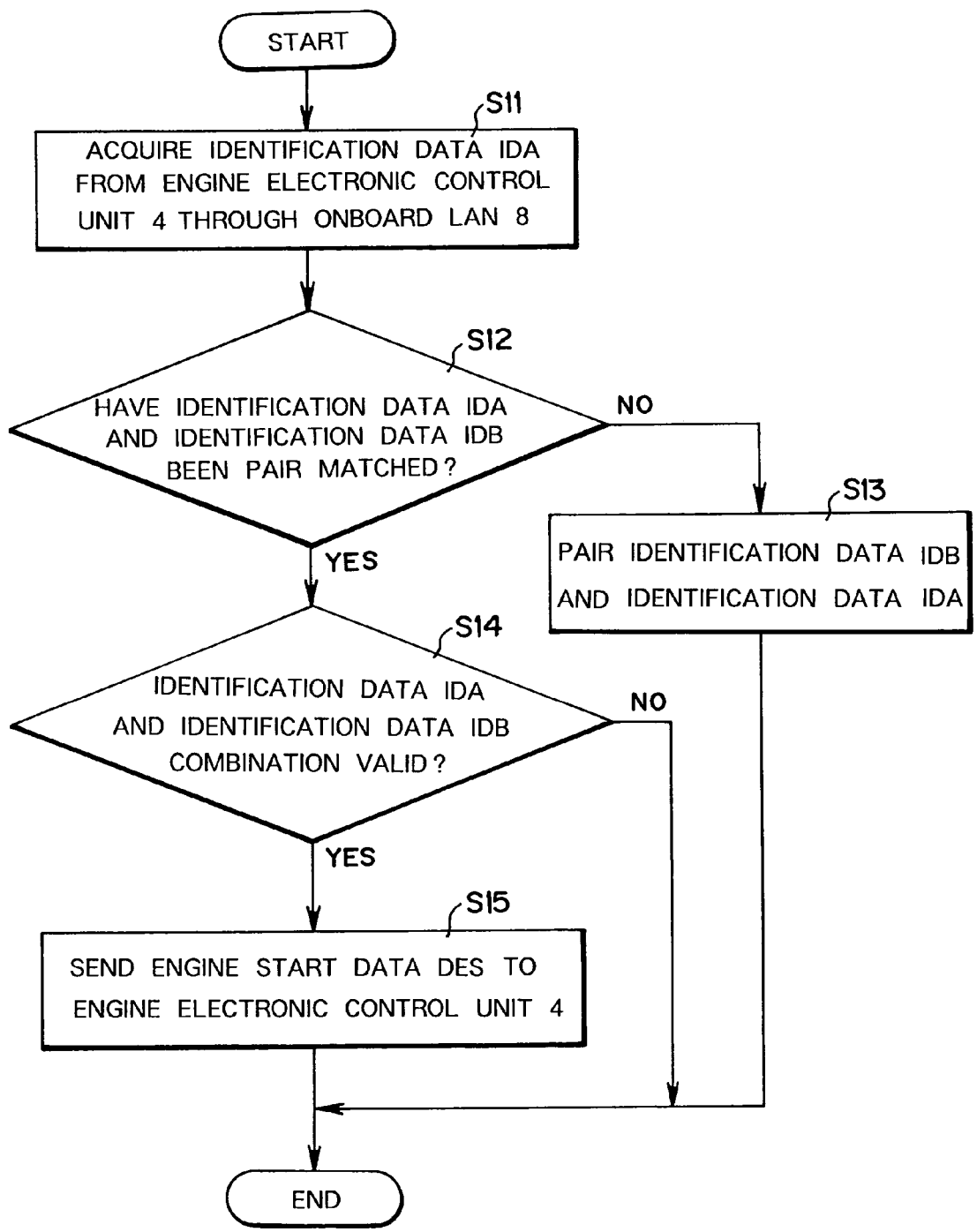
FIG. 3 is a flow chart representing an engine start data transmit processing program executed in the CPU of the transmission electronic control unit.

FIG. 2 is a flow chart representing an engine control processing program executed by a CPU 4B of the engine electronic control unit 4, and FIG. 3 is a flow chart representing an engine start data transmit processing program executed by a CPU 5B of the transmission electronic control unit 5.

The engine control processing program will be explained first with reference to FIG. 2. Execution of the engine control processing program is initiated by the operator turning the key switch 10 from OFF to ON. In step S1, the immobilizer unit 9 is requested to supply personal identification number data. Next, in step S2, it is checked whether acquisition of the personal identification number data has been completed. When acquisition of the personal identification number data has not been completed, the discrimination result in step S2 is NO and the program returns to step S2, whereafter step S2 is repeated until acquisition of the personal identification number data has been completed. When the acquisition of the personal identification number data has been completed owing to the input of a personal identification number through the immobilizer unit 9, the discrimination result in step S2 become YES and the program goes to step S3.

In step S3, it is checked based on the received personal identification number data whether the person who input the personal identification number is an authorized operator. Specifically, it is checked whether the input personal identification number data match or do not match personal identification number data registered in the memory 4A of the engine electronic control unit 4 beforehand. When the personal identification number data match registered personal identification number data, the person is judged to be an authorized operator, so that the discrimination result in step S3 becomes YES and the program goes to step S4.

In step S4, the transmission electronic control unit 5 is requested to supply the engine start data DES. Then, in step S5, it is checked whether acquisition of the engine start data DES has been completed. When acquisition of the engine start data DES has not been completed, the discrimination result in step S5 is NO and step S5 is repeated until acquisition of the engine start data DES has been completed. When the acquisition of the engine start data DES has been completed, the discrimination result in step S5 becomes YES and the program goes to step S6.

In step S6, the engine start data DES are used to take steps for starting the engine, whereafter the engine control processing program is terminated.

In step S3, when it is found based on the input personal identification number data that the person is not an authorized operator, the discrimination result in step S3 becomes NO and the program goes to step S7. In step S7, an emergency mode is implemented, such as by stopping the supply of power to the key switch 10, so that the key switch 10 can no longer be used for a power-on operation unless a prescribed operation is performed. The program is then terminated.

The engine start data transmit processing program will now be explained with reference to FIG. 3. Execution of the engine start data transmit processing program is also initiated upon the key switch 10 being turned from OFF to ON. First, in step S11, the identification data IDA of the engine electronic control unit 4 are acquired from the memory 4A through the onboard LAN 8.

Next, in step S12, a check is made as to whether the identification data IDA of the engine electronic control unit 4 and the identification data IDB of the transmission electronic control unit 5 have already been pair matched. When the identification data IDA and the identification data IDB have not yet been pair matched, the discrimination result in step S12 is NO and the program goes to step S13, in which the identification data IDB and identification data IDA are paired, whereafter the program is terminated. When the identification data IDA and identification data IDB have already been pair matched, the discrimination result in step S12 is YES and the program goes to step S14.

In step S14, it is checked whether the identification data IDA and identification data IDB combination is valid. When not valid, the discrimination result in step S14 is NO and the program is terminated. When the combination is valid, the discrimination result in step S14 is YES and the program goes to step S15.

In step S15, the engine start data DES are sent to the engine electronic control unit 4 when requested by the engine electronic control unit 4, whereafter the program is terminated.

Owing to the foregoing configuration of the vehicle system 1, once someone has switched the key switch 10 from OFF to ON, the immobilizer unit 9 prompts the person to input a personal identification number. After the person has responded by inputting a personal identification number, the input personal identification number is used to check whether the person is an authorized operator of the vehicle.

When the person is found to be an authorized operator, the engine electronic control unit 4 requests the transmission electronic control unit 5 to send the engine start data DES required for starting the engine. The transmission electronic control unit 5 acquires the identification data IDA from the engine electronic control unit 4 and checks the validity of the combination between the identification data IDA and its own identification data IDB, whereafter it sends the engine start data DES to the engine electronic control unit 4 only if the combination is found to be valid.

Therefore, if someone who does not know the personal identification number should attempt to start the engine 2 by, for example, making ready a non-genuine engine electronic control unit without immobilization capability and deliberately replacing the engine electronic control unit 4 with the non-genuine engine electronic control unit, the discrimination result in step S14 will be NO because data pair matching between the non-genuine engine electronic control unit and the transmission electronic control unit 5 cannot be properly completed. The engine start data DES stored in the transmission electronic control unit 5 will therefore not be sent to the non-genuine engine electronic control unit, making it impossible to start the engine.

The vehicle can therefore be effectively protected against theft because the engine 2 cannot be started even by replacing the engine electronic control unit 4 and inputting the known personal identification number of the replacement. Although it is possible to start the engine by simultaneously replacing the transmission electronic control unit 5, this requires a considerable amount of labor because the transmission electronic control unit 5 is mounted inside the automatic transmission 3. The vehicle can therefore be very effectively protected against theft.

As explained in the foregoing, in the present invention the transmission electronic control unit and the engine electronic control unit are individually assigned identification data and the transmission electronic control unit is further made to retain data required for starting the engine, the validity of the combination of the two kinds of identification data is checked at the time of engine starting, and the data required for engine starting are sent to the engine electronic control unit only if validity is confirmed. If someone should replace only one of the electronic control units, therefore, the combination of the two types of identification data will be found invalid, in which case the data required for starting the engine will not be sent to the engine electronic control unit and theft of the vehicle by replacement of an electronic control unit will be very effectively prevented.

INDUSTRIAL APPLICABILITY

As explained in the foregoing, the vehicle electronic control system with anti-theft capability and method of controlling a vehicle engine according to the present invention are useful for effectively preventing vehicle theft by replacement of an electronic control unit.

What is claimed is:

1. A vehicle electronic control system with anti-theft capability, which includes an automatic transmission control system having a transmission electronic control unit built into a transmission and an engine control system constituted to comprise an engine electronic control unit for controlling engine operation, which vehicle electronic control system with anti-theft capability is characterized in that:
   unit-specific identification data are stored in each of the transmission electronic control unit and the engine electronic control unit for identifying the units,
   engine start data required for starting the engine are stored in the transmission electronic control unit, and, at the time of engine starting,
   the validity of the combination of the transmission electronic control unit and the engine electronic control unit is checked based on the unit-specific identification data, and the engine start data are supplied to the engine control system only when validity is confirmed.

2. A method of controlling a vehicle engine of a vehicle equipped with an automatic transmission control system having a transmission electronic control unit built into a transmission and an engine control system constituted to comprise an engine electronic control unit for controlling engine operation, which method of controlling a vehicle engine is characterized in that the transmission electronic control unit at the time of engine starting comprises:
   a discrimination step for discriminating validity of the combination with the engine electronic control unit and
   a step of sending data required for starting the engine from the engine control system to the engine control system only when validity is confirmed in the discrimination step.

3. A method of controlling a vehicle engine as claimed in claim 2, wherein the discrimination step is a step of, in response to input of personal identification data from an immobilizer unit, checking unit-specific identification data assigned beforehand to the transmission electronic control unit against unit-specific identification data assigned beforehand to the engine electronic control unit.

* * * * *